(12) United States Patent
Lorenzen

(10) Patent No.: US 8,234,944 B2
(45) Date of Patent: Aug. 7, 2012

(54) ACTUATOR

(75) Inventor: Anders B. Lorenzen, Åbenrå (DK)

(73) Assignee: Linak A/S, Nordborg (DK)

( * ) Notice: Subject to any disclaimer, the term of this patent is extended or adjusted under 35 U.S.C. 154(b) by 0 days.

(21) Appl. No.: 12/735,414

(22) PCT Filed: Feb. 9, 2009

(86) PCT No.: PCT/DK2009/000035
§ 371 (c)(1),
(2), (4) Date: Jul. 14, 2010

(87) PCT Pub. No.: WO2009/097856
PCT Pub. Date: Aug. 13, 2009

(65) Prior Publication Data
US 2011/0043062 A1 Feb. 24, 2011

(30) Foreign Application Priority Data
Feb. 8, 2008 (DK) ................................ 2008 00177

(51) Int. Cl.
*F16H 27/02* (2006.01)
*F16H 29/02* (2006.01)
*B65H 59/10* (2006.01)

(52) U.S. Cl. ................. 74/89.38; 74/89.39; 188/67

(58) Field of Classification Search ........... 74/89.23, 74/89.26, 89.38, 89.39, 89.42, 89.45; 403/329; 188/67, 77 W, 77 R, 199
See application file for complete search history.

(56) References Cited

U.S. PATENT DOCUMENTS

| | | | | |
|---|---|---|---|---|
| 5,342,139 A | * | 8/1994 | Hoffman | 403/327 |
| 5,801,902 A | * | 9/1998 | Koeppel et al. | 360/99.08 |
| 5,811,903 A | * | 9/1998 | Ueno et al. | 310/90 |
| 5,836,462 A | * | 11/1998 | Liljedahl | 212/260 |
| 7,849,756 B2 | * | 12/2010 | Minnig et al. | 74/89.26 |
| 2006/0243075 A1 | * | 11/2006 | Liou et al. | 74/89.39 |
| 2009/0133519 A1 | * | 5/2009 | Lorenzen | 74/89.32 |
| 2011/0043062 A1 | * | 2/2011 | Lorenzen | 310/83 |

FOREIGN PATENT DOCUMENTS

| | | |
|---|---|---|
| DE | 19647556 | 5/1998 |
| DE | 19950689 | 11/2000 |
| DK | 130460 | 2/1975 |
| EP | 685662 A2 * | 12/1995 |
| EP | 1457710 | 9/2004 |
| WO | WO 2007025550 A1 * | 3/2007 |
| WO | WO 2009097856 A1 * | 8/2009 |

OTHER PUBLICATIONS

English Abstract of EP1457710.
English Abstract of DE19950689.
English Abstract of DE19647556.

* cited by examiner

*Primary Examiner* — Justin Krause
*Assistant Examiner* — Adam D Rogers
(74) *Attorney, Agent, or Firm* — Dykema Gossett PLLC

(57) ABSTRACT

An emergency lowering (retraction) mechanism for a linear actuator includes first and second cylindrical parts, an operating handle outside of the first cylindrical part, and a coil spring which has a first end connected to the operating handle, a second end connected to the second cylindrical part, and a plurality of windings, with some of the windings wrapping around and contacting the outer periphery of the first cylindrical part and some wrapping around and contacting the outer periphery of the second cylindrical part.

8 Claims, 5 Drawing Sheets

ACTUATOR

BACKGROUND OF THE INVENTION

1. Field of the Invention

The invention relates to a linear actuator having an emergency release mechanism.

2. The Prior Art

Briefly, a linear actuator consists of a spindle driven by a reversible electric motor through a transmission. On the spindle there is a nut having an activation rod secured thereto. By fixing the spindle nut against rotation, it will move in or out along the spindle depending of the direction of rotation of the motor. With movement of the spindle nut, the activation rod is either extended or retracted.

Depending on the construction in which the actuator is incorporated, the actuator may be equipped with a quick release or emergency lowering function. Quick releases are typically used in actuators for hospital and care beds in order to instantaneously perform a quick adjustment, i.e., lower the back rest section in case the patient on the bed has a heart attack or falls into a coma. Emergency manual operation is typically used for actuators incorporated in patient lifts to make it possible to lower the patient despite a power failure. In this case, it is a question of lowering the patient as gently as possible within a given time.

The present invention relates to emergency lowering and examples of this are, i.e., known from DE 196 47 556 A1 to Rudolf Weiner, where the activation rod is released by pulling out a pin, and in doing so, the activation rod may be manually turned inwards by grasping it. In DK 130 460 to Trioteam A/S, the activation rod is retained by a split bushing which may be loosened by means of an operating hand lever. DE 199 50 689 A1 to Okin discloses a construction having two coupling parts with teeth, which are spring loaded for mutual mesh. By releasing the clutch, the activation rod may manually be rotated inwards. EP 789 665 to Liko discloses a construction with a prestressed friction disc, where the friction is adopted so that the activation rod is secured against rotation during normal operation, but may be overcome with an external torque, i.e., by turning a bushing causing the activation rod to be screwed backwards. EP 1 457 710 A1 to SKF discloses a construction comprising a claw clutch surrounded by a coil spring, functioning as a brake. By rotating the operating handle to a certain angle, the claw clutch is released and the load on the mounting fittings thus causes the spindle nut, and the activation rod connected thereto, to be screwed inwards on the non self-locking spindle, by means of which the claw clutch again engages the retracting spring and thus brakes the further movement of the activation rod. To lower the load, the claw clutch should thus be operated repeatedly. The condition for the mode of operation of this construction is that the spindle/nut is non self-locking, the construction does not function with a self-locking spindle, and it further does not work in an unloaded state, as it is the load which pushes the activation rod backwards.

It is evident that the load permanently rests on the activation rod, and in order to retain this in a random position, the spindle/nut in itself will have to be self-locking, and if a non self-locking spindle is used, the gearing and motor will have to possess the sufficient self-locking ability, alternatively the actuator should comprise a brake. This also causes the resulting force from the load to run through the emergency lowering mechanism and thus contributes to pressing the activation rod backwards, when the emergency lowering mechanism is activated.

Lastly, WO 2007/025550 A1 to Linak discloses a construction with a coil spring, which as a clutch spring with a number of windings, placed tightly around the cylindrical part connected to the front mounting and with an end is secured to the other cylindrical part connected to the activation rod and where a ball bearing is located between the two cylindrical parts. The construction is operated by means of an operating handle designed as a bushing, in which the upper end of the spring, which is located opposite the cylindrical part connected to the front mounting, is secured.

The problem with the known emergency lowering mechanisms is that they both are greatly dependent on load and are sensitive to the friction, which during operation changes from a static friction to a dynamic friction, which again is dependent on temperature, wearing, lubrication etc. This may result in that the lowering occurs at an uncontrolled speed or that it requires so much torque that the operation becomes difficult, or even impossible.

The invention derives from the construction in WO 2007/025550 A1 to Linak, as it is distinguished in its simplicity and few components.

The purpose of the invention is to provide an emergency lowering mechanism which counters the problems of the known constructions, i.e., to provide an emergency lowering mechanism which is simple, only consists of few components, is more or less and independent on load, which has a smooth-running operation process.

SUMMARY OF THE INVENTION

This is achieved according to the invention by configuring the coil spring of the emergency lowering (retraction) mechanism of the actuator to have a number of windings around the cylindrical part connected to the activation rod. Thus, a smooth-running, controlled servo-like operation of the emergency lowering mechanism is quite surprisingly achieved. The operation is both smooth-running, controlled and overall independent on the load. The quicker the operating handle is turned, the quicker the activation rod is screwed inwards on the spindle nut and the load is lowered correspondingly. By rotating the operating handle a torque is inflicted on the coil spring, which causes the upper part of the spring to expand just enough for it to release the cylindrical part connected to the activation rod. It is essential that the spring has a large spring constant so that even a small rotation of the operating handle causes the spring to be loosened. The diameter of the cylindrical parts, on which the spring is located, is also an influencing factor. All things equal, a larger diameter will cause a strongly reduced holding torque, which is why it is desirable that the diameter of the cylindrical parts is not too large. A magnitude where it is possible with one hand to span the operating handle has proven to be suitable. It has also proven to be important for the function that the windings of the spring lie loosely side by side and have not been prestressed against each other in the axial direction. In this way, the spring is self-regulating and constantly seeks to maintain its own holding force. The number of windings, wrapped tightly around the cylindrical part connected to the activation rod, is so large that the coil spring does not lose its grip on this. In order to further ensure that the spring does not lose its grip, the end of the spring may be secured hereto, i.e., by means of a bent end, which reaches into a recess in the cylindrical part. The spring is so rigid that by operating the operating handle, the activation rod is moreover rotated, which is possible since it is released from the front mounting and that there moreover is a smooth-running bearing between the two cylindrical parts of the emergency lowering mechanism. During the manual operation, the activation rod is permanently under control of the operating handle via the connection over the spring.

Embodiments according to the invention will be described more fully below with reference to the accompanying drawings.

DETAILED DESCRIPTION OF THE PREFERRED EMBODIMENTS

Figure 1:
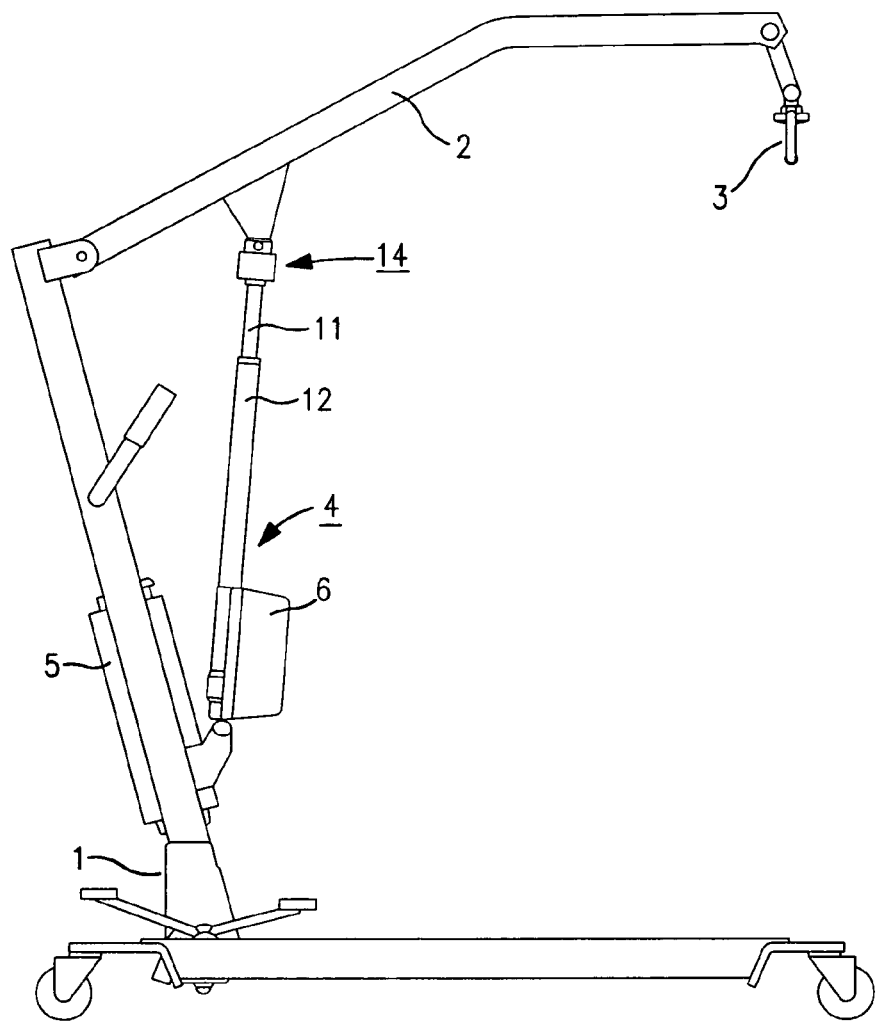
FIG. 1 shows a patient lift seen from the side.

The patient lift shown in FIG. 1 comprises a frame 1 equipped with drive wheels. A cantilever 2 pivotable around a horizontal axis is with one end secured to the frame. To the other end of the cantilever, a lifting hook 3 is secured for lifting a patient. The cantilever 2 may be raised and lowered by means of a linear actuator 4, which with one end is secured to the frame and with the other end is secured to the cantilever 2. A control box 5 comprising a control device and rechargeable batteries for running the actuator 4 is mounted on the frame 1.

Figure 2:
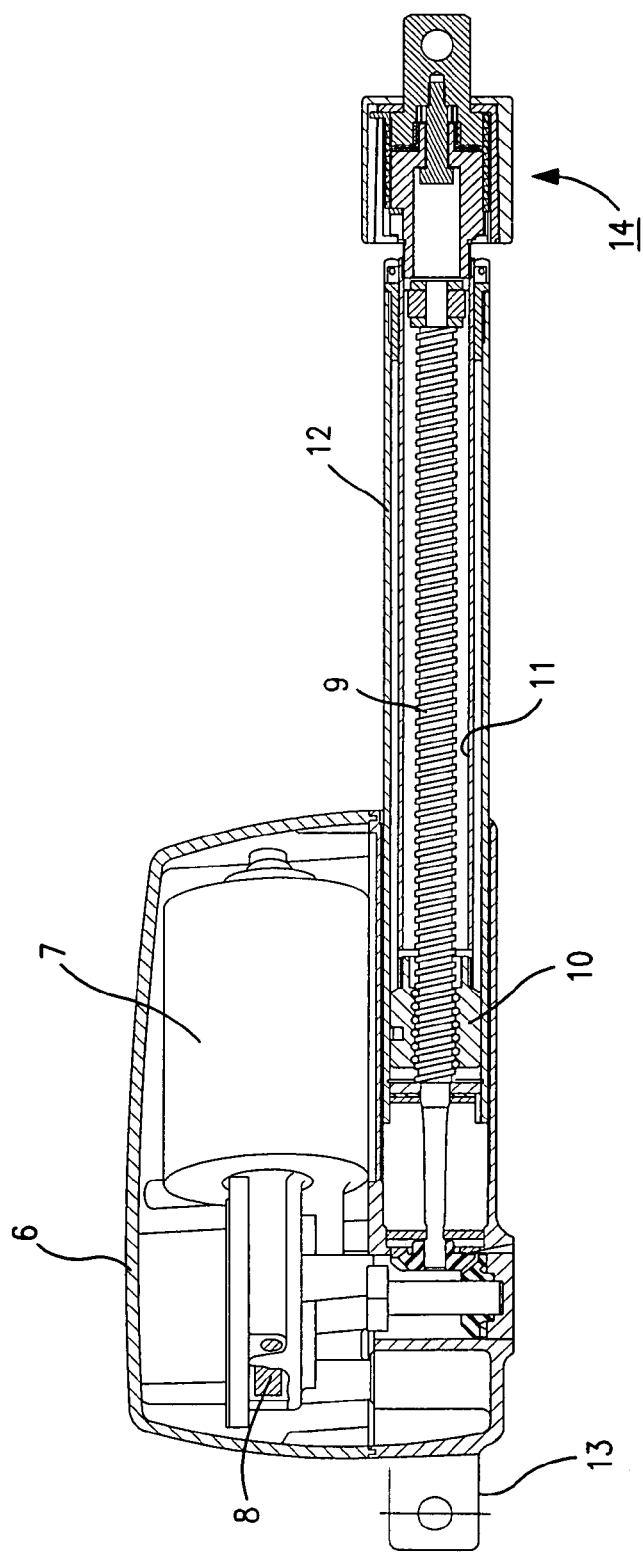
FIG. 2 shows a longitudinal section through a linear actuator.

As it appears from FIG. 2, the main components of the actuator 4 are constituted by a cabinet 6 with a reversible electric motor 7, which through a transmission 8, specifically a worm drive and an angle gear, drives a spindle 9 with a spindle nut 10, whereto an activation rod 11 (inner tube) is secured, telescopically guided in a tubular part (outer tube) 12 of the cabinet 6. For securing the rear end of the actuator, the housing 6 is equipped with a rear mounting 13.

Figure 3:
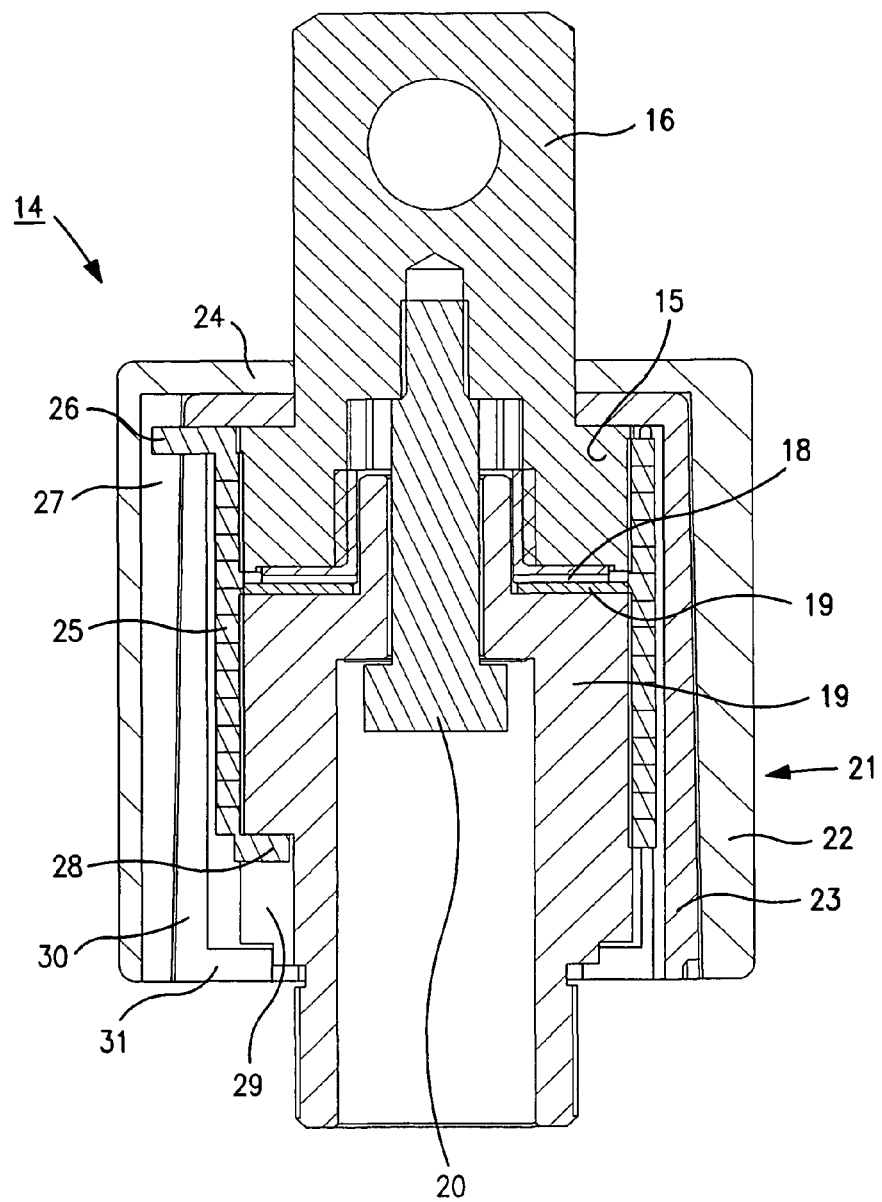
FIG. 3 shows a longitudinal section through an emergency lowering mechanism.

At the end of the activation rod 11 an emergency lowering mechanism 14 is secured. Referring to FIG. 3, the emergency lowering mechanism comprises a first cylindrical part 15, which carries a mounting fitting 16 for securing the front end of the actuator. With another cylindrical part 17 the emergency lowering mechanism is secured to the end of the activation rod 11. Between the two cylindrical parts 15,17 there is a slide bearing 18, which with a collar is secured against rotation in the cylindrical part 15. In order to have an even and smooth surface for the sliding bearing 18 to rotate on, a steel disc 19 is placed under this on the upper side of the cylindrical part 17. The two cylindrical parts 15,17 are axially mutually retained by means of a bolt 20, which exclusively serves to prevent the parts from separating. Besides the two cylindrical parts 15,17, there is an operating handle in the form of a bushing 21, consisting of an inner and an outer part 23,22, where the outer part 22 is designed as an operation handle. The bushing 21 has an end wall 24 and is placed with a hole over a mounting fitting 16 and is rotatably embedded on the upper side of the cylindrical part 15. Around the cylindrical parts 15,17 there is a prestressed coil spring 25. An end 26 of the spring bent outwards is secured in a longitudinal guide 27 in the bushing 21. The other end 28 of the spring is bent inwards and is secured in a recess 29 in the other cylindrical part 17. The inner part 23 of the bushing 21 has three resilient legs 30 with a foot 31 which reaches under the cylindrical part 17 for retaining the bushing.

In case of a power failure, the cantilever 2 on the patient lift may be manually lowered by means of the emergency lowering mechanism. When the operating handle the bushing 21—is rotated clockwise, the end 26 of the spring is likewise rotated clockwise, which causes the diameter of the spring to expand a bit and is thus released from the cylindrical part 15. The lower end of the spring is permanently retained on the cylindrical part 17. As the cylindrical part 15 with the mounting fitting 16 is released from the cylindrical part 17 in the end of the activation rod 11, this is rotated together with the bushing 21 and the spindle nut 10 is screwed inwards on the spindle 9, causing the activation rod 12 to be retracted and the cantilever 2 is lowered to the initial position. When the bushing 21 is released, the spring 25 with its upper part instantaneously couples to the cylindrical part 15.

It is noticed that the spring 25 with its upper part has five windings enveloping the cylindrical part 15 and about twice as many windings enveloping the other cylindrical part 17, by which it is ensured that the spring does not at any time release its hold on the cylindrical part 17 and is through the spring permanently controlled by the movement of the bushing.

Figure 4:
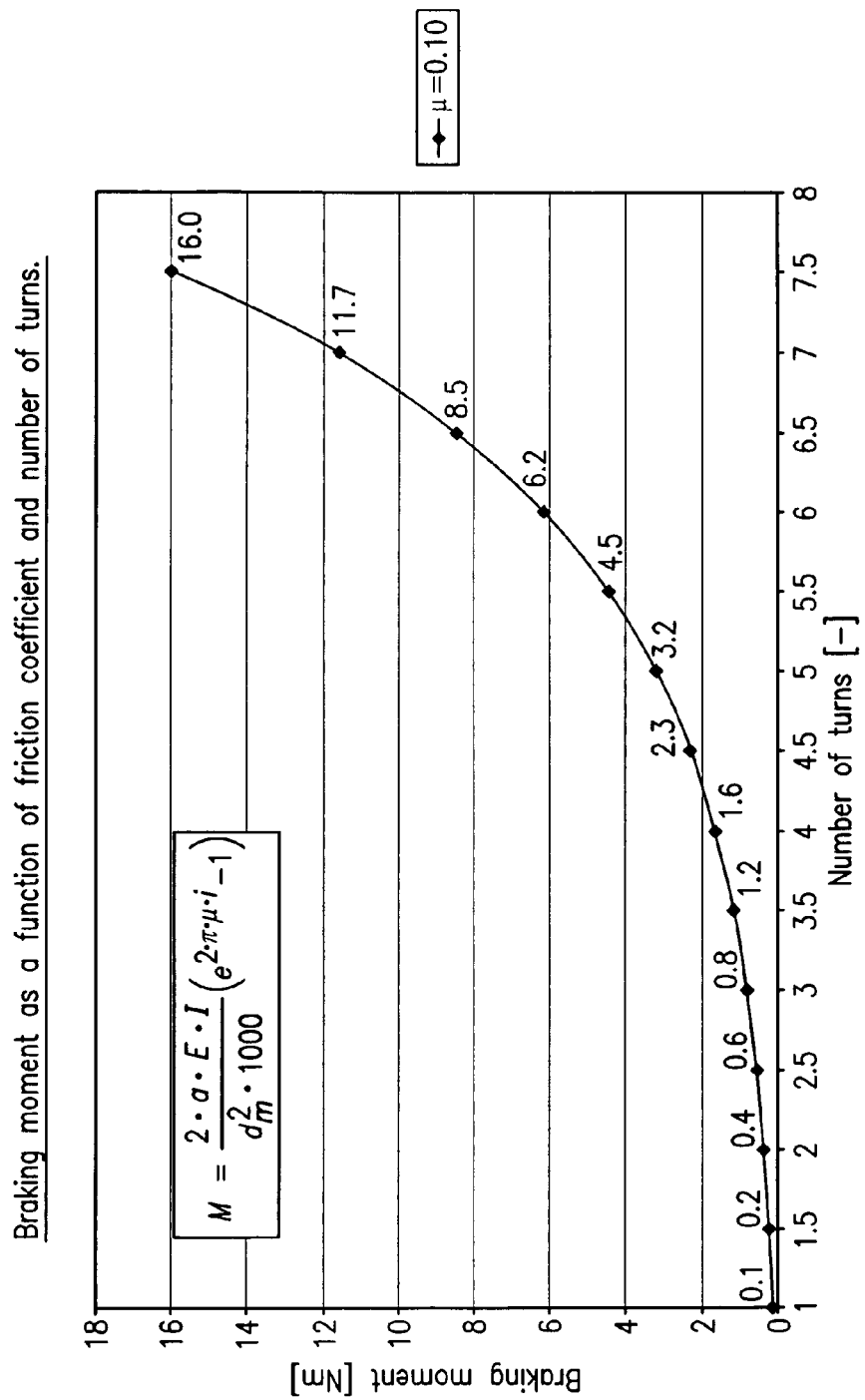
FIG. 4 shows a curve of brake torque for the coil spring.

In order to illustrate the forces occurring in connection with the coil spring, a curve for the braking torque dependent on the number of windings of the spring is shown in FIG. 4. The curve is calculated based on the formula of Euler-Eytelwein. As it appears, the braking torque decreases dramatically as a result of only a small rotation of the spring, as the braking torque follows an exponential function. By merely loosening the first winding, here from 7½ to 6½ winding, the braking torque decreases from 16.0 Nm to 8.5 Nm. This only emphasizes that the operating handle from the beginning brings the activation rod along as almost no rotation of the spring is needed before it loses its grip around the cylindrical part on the front mounting.

Figure 5:
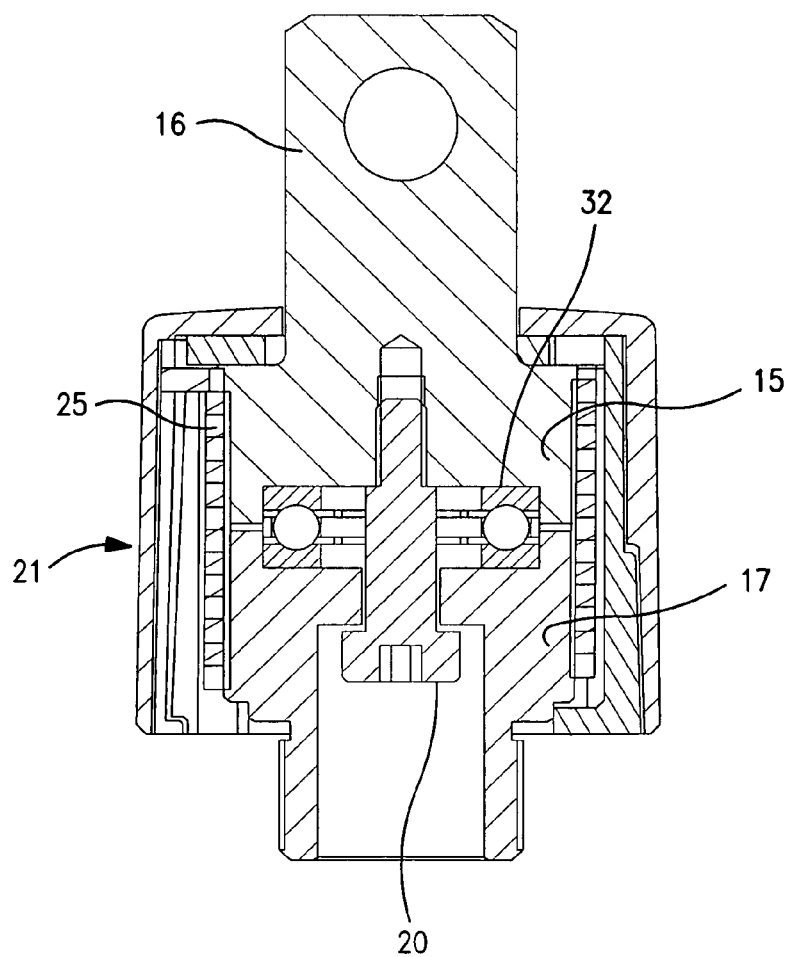
FIG. 5 shows a longitudinal section through another embodiment of an emergency lowering mechanism.

In FIG. 5 of the drawing, another embodiment of the emergency lowering mechanism is shown. The difference compared to the embodiment shown in FIG. 3 is merely that a thrust bearing 32 is used here, which all things equal results in a lower friction than when using a slide bearing. For the same parts the same reference numerals as in FIG. 3 have been used.

The invention claimed is:
1. An actuator which comprises:
a rotatable spindle which has a forward end and a rear end,
a spindle nut mounted on said spindle to move along said spindle between said forward and rear ends thereof upon rotation of said spindle,
a reversible electric motor,
a transmission interconnected between said motor and said rear end of said spindle to rotate said spindle,
an activation rod attached to said spindle nut to extend towards and beyond said forward end of said spindle,
a front mount for attachment to a movable part of an item of an apparatus, and
an emergency retraction mechanism connected between the front mount and the activation rod, said emergency retraction mechanism comprising:
a first cylindrical part attached to the front mount,
a second cylindrical part attached to the activation rod,
a bearing located between said first and second cylindrical parts to enable rotative rotation therebetween,
an operating handle around said first cylindrical part, and
a coil spring around and in contact with outer peripheries of said first and second cylindrical parts, said coil spring having a larger number of windings wrapped around and in contact with the outer periphery said second cylindrical part than the number of windings wrapped around and in contact with the outer periphery of said first cylindrical part, said coil spring having a first end attached to said operating handle and a second end connected to said second cylindrical part, rotation of said operating handle operating to expand the coil spring out of contact with said first cylindrical part and enable relative motion between the first and second cylindrical parts, and enable retraction of said spindle nut towards said rear end of said spindle.

2. The actuator according to claim 1, the bearing comprises a slide bearing.

3. The actuator according to claim 2, including a steel disc between the slide bearing and the second cylindrical part.

4. The actuator according to claim 1, wherein the bearing comprises a thrust bearing.

5. The actuator according to claim 1, wherein said operating handle includes an internal longitudinal recess and said first end of said coil spring extends into said recess.

6. The actuator according to claim 1, wherein said second cylindrical part includes an external recess and said second end of said coil spring extends into said recess.

7. The actuator according to claim 1, wherein said operating handle comprises an outer cylindrical part, an inner cylindrical part, and connection means therebetween.

8. The actuator according to claim 7, wherein said inner cylindrical part includes resilient legs with feet for engagement with respective recesses in the second cylindrical part.

* * * * *